United States Patent
Schoenike

(10) Patent No.: US 7,003,911 B2
(45) Date of Patent: Feb. 28, 2006

(54) FLY-FISHING STRIKE INDICATOR

(76) Inventor: Larry R. Schoenike, Box 2647, Ketchum, ID (US) 83340

( * ) Notice: Subject to any disclaimer, the term of this patent is extended or adjusted under 35 U.S.C. 154(b) by 0 days.

(21) Appl. No.: 10/329,106

(22) Filed: Dec. 23, 2002

(65) Prior Publication Data

US 2004/0118030 A1  Jun. 24, 2004

(51) Int. Cl.
A01K 91/00 (2006.01)
A01K 93/02 (2006.01)
A01K 97/12 (2006.01)

(52) U.S. Cl. .......... 43/17; 43/44.91; 43/43.1; 43/44.9

(58) Field of Classification Search .......... 43/44.9, 43/44.91, 43.1, 17
See application file for complete search history.

(56) References Cited

U.S. PATENT DOCUMENTS

| | | | | |
|---|---|---|---|---|
| 2,186,281 A | * | 1/1940 | Cochran | 43/44.9 |
| 2,591,558 A | * | 4/1952 | Kramer | 43/44.9 |
| 2,713,742 A | | 7/1955 | Holdaway | 43/42.38 |
| 2,860,443 A | | 11/1958 | Robinson | 43/44.4 |
| 2,883,785 A | | 4/1959 | Croft | 43/42.09 |
| 3,029,544 A | | 4/1962 | Dimatteo | |
| 4,205,477 A | * | 6/1980 | Fajt | 43/43.12 |
| 4,796,377 A | * | 1/1989 | Hosegood | 43/43.1 |
| 4,823,495 A | | 4/1989 | Camilleri | 43/43.13 |
| 4,864,767 A | | 9/1989 | Drosdak | 43/43.1 |
| 5,042,190 A | * | 8/1991 | Calvin | 43/43.1 |
| 5,216,831 A | * | 6/1993 | Halterman | 43/44.91 |
| 5,459,959 A | * | 10/1995 | Paradis | 43/44.89 |
| 5,758,451 A | * | 6/1998 | Wolfe | 43/44.91 |
| 5,887,378 A | | 3/1999 | Rhoten | 43/42.03 |
| 6,009,659 A | * | 1/2000 | Shannon et al. | 43/44.91 |
| 6,125,574 A | * | 10/2000 | Ganaja | 43/43.1 |
| 6,421,950 B1 | | 7/2002 | Constantin | 43/44.98 |
| D462,413 S | | 9/2002 | Teegarden | D22/126 |
| 2002/0095853 A1 | | 7/2002 | Teegarden | 43/42.1 |

* cited by examiner

Primary Examiner—Kurt Rowan
(74) Attorney, Agent, or Firm—Pedersen & Co., PLLC; Ken J. Pedersen; Barbara S. Pedersen

(57) ABSTRACT

A fishing line strike indicator and improved hook setter. This device utilizing a body having a hole there through for allowing a fishing line to be inserted and affixed thereto. A water deflector extends from this body and faces the attached lure. When a fish strikes the lure attached to the fishing line attached to the strike indicator, the strike indicator, as it is pulled through the water by the fish pulling the line attached to the lure or by the current of the water, offers resistance in the water thereby increasing the chances that hook will be automatically set in the fish's mouth.

1 Claim, 1 Drawing Sheet

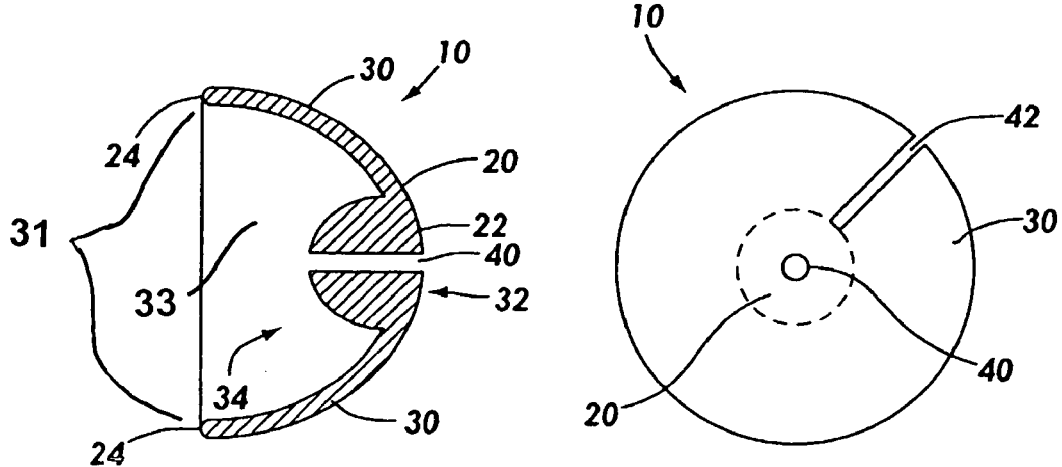
Fig. 1
Fig. 2
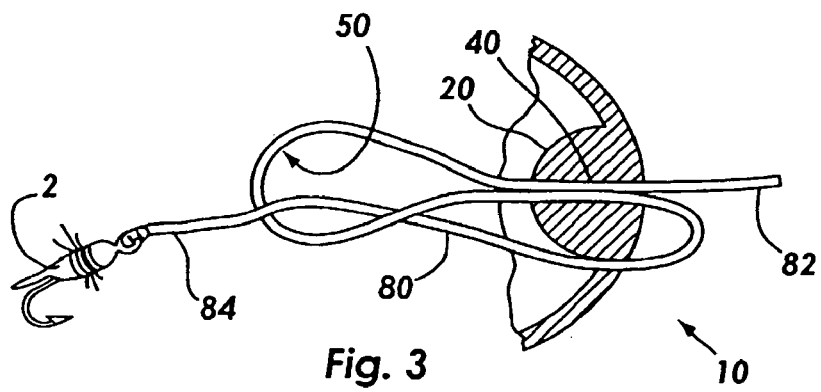
Fig. 3
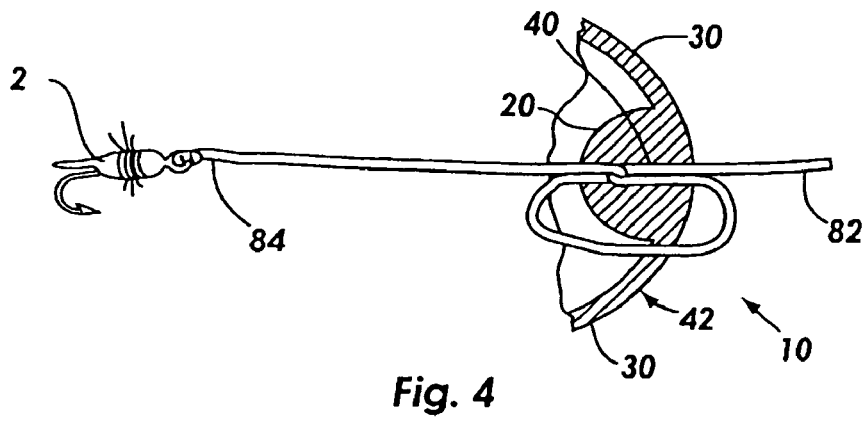
Fig. 4

FLY-FISHING STRIKE INDICATOR

BACKGROUND OF THE INVENTION

1. Field of the Invention

The present invention generally relates to fishing, and more particularly relates to strike indicators and devices for setting fishhooks.

2. Background Information

When an underwater fly is used in fly-fishing, the strike of a fish is often difficult to detect. Within the last fifteen years, fly-fishermen have begun using strike indicators attached to the leaders of their fly lines to better detect when a fish strikes their fly.

Typically, a fly is cast upstream and is fished back downstream to the fisherman. The fly typically moves naturally with the current downstream towards the fisherman. The fisherman often utilizes a floating strike indicator to help track the progress of the fly downstream. If a fish bites or eats the fly, motion will be imparted on the strike indicator which is inconsistent with the current (i.e. the strike indicator may move underwater, may move upstream instead of downstream, or may move cross-current, etc.). Should the fisherman notice this inconsistent movement; the fisherman will attempt to quickly set the hook embedded in the fly (or other lure) through manipulation of the fishing pole. The fisherman must attempt to set the hook very quickly or risk giving the fish time to determine that the lure is not really something it wants to eat, whereby the fish would spit the fly out of its mouth.

All strike indicators attempt to signal the moment that the fly has been eaten by the fish. The fisherman must maintain a balance between letting the fly float naturally with the current and keeping the line taught enough to deliver a quick, sharp hook set. Beginning fly-fishermen find this very difficult and experienced fly-fishermen never fully master the technique. All strike indicators may not signal a fish taking the fly if a poor cast allows a large amount of slack line between the fly and indicator.

A large percentage of the time that a fish strikes a fly, the fish is not hooked, typically due to the fact that the fisherman does not realize the fly has been stricken until it is too late. Rarely, perhaps as low as five percent of the time, the fish's actions (i.e., swallowing the lure, movement it the ideal direction, etc.) will actually set the hook all by itself.

What is needed is a strike indicator that increases the chance that the fish will set the hook all by itself. The present invention solves this need.

Additional objects, advantages and novel features of the invention will be set forth in part in the description which follows and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

The present invention is an improved strike indicator for fishing lines, particularly fly-fishing lines. While the description of the present invention details the application of the present invention to fly-fishing, such a description is not intended to be exclusive, and all types and forms of fishing are deemed included in this discussion of "fly-fishing."

The invented strike indicator not only signals that a fish has struck the fly (as all indicators theoretically do), but it also greatly increases the chance that the fish will set the hook itself.

One embodiment of the present invention comprises a fishing line accessory for attachment to a fishing line having an attached lure. This accessory comprising a strike indicator configured for fixed attachment to the fishing line. This strike indicator having a body having a water deflecting portion extending from the body. It is preferred that this water-deflecting portion be generally disc-shaped. Likewise, it is preferred that this strike indicator be formed of a buoyant material for allowing the strike indicator to float on or near the water's surface.

In another embodiment of the present invention, the present invention comprises a fishing line strike indicator for use on a length of fishing line. This fishing line having a fishing pole end for attaching to a fishing pole and a fishing lure end for attaching to a fishing lure. The strike indicator comprising a body for fixedly attaching to the fishing line. This body having a first end extending to a second end, wherein the first end faces the fishing pole end and the second end faces the fishing lure end. This body preferably configured of a buoyant or near-buoyant material. The body second end comprising a deflector for deflecting water. This deflector having a convex side and a concave side, wherein the concave side faces the fishing lure end of the fishing line. Preferably, the deflector is generally cup-shaped, having an apex opposite a rim, wherein the rim is oriented on the line facing the fishing lure end and wherein the apex is oriented on the line facing the fishing pole end.

In another embodiment, the present invention is a fish hook setting apparatus. This fish hook setting apparatus for use on a length of fishing line, this fishing line having a fishing pole end for attaching to a fishing pole and a fishing lure end for attaching to a fishing lure. The apparatus itself comprising: a body, a deflector, a line connector, and a fishing lure. The body having a first end extending to a second end, wherein the first end is configured to face the fishing pole end and the second end is configured to face the fishing lure end. The deflector for deflecting water, this deflector attaching to the body. The deflector extending from the body. The line connector for connecting the apparatus to the fishing line, this line connector attaching to the body and providing for the fixed attachment of the body to the fishing line. The fishing lure for luring fish attaching to the fishing line fishing lure end.

Still other objects and advantages of the present invention will become readily apparent to those skilled in this art from the following detailed description wherein I have shown and described only the preferred embodiment of the invention, simply by way of illustration of the best mode contemplated by carrying out my invention. As will be realized, the invention is capable of modification in various obvious respects all without departing from the invention. Accordingly, the drawings and description of the preferred embodiment are to be regarded as illustrative in nature, and not as restrictive in nature.

BRIEF DESCRIPTION OF THE DRAWINGS

FIG. 1 is a cross-sectional, side view of one embodiment of the present invention.

FIG. 2 is a lure end view of the embodiment of FIG. 1.

FIG. 3 is a partial, side cross-sectional, environmental view of one embodiment of the present invention showing the manner in which the invented strike indicator is attached to the line.

FIG. 4 is a partial, side cross-sectional, environmental view of one embodiment of the present invention showing the manner in which the invented strike indicator is attached to the line.

DESCRIPTION OF THE PREFERRED EMBODIMENTS

While the invention is susceptible of various modifications and alternative constructions, certain illustrated embodiments thereof have been shown in the drawings and will be described below in detail. It should be understood, however, that there is no intention to limit the invention to the specific form disclosed, but, on the contrary, the invention is to cover all modifications, alternative constructions, and equivalents falling within the spirit and scope of the invention as defined in the claims.

The present invention comprises a strike indicator and hook setter for use on a fishing line, this strike indicator having a water deflecting portion configured to deflect water as the lure pulls the fishing line through the water, for instance where a fish has struck the fishing line and is swimming away from the fisherman. In this description, the term "fly" and "lure" are used as generic names of any fly, lure, bait, hook, or other fish hooking apparatuses.

Referring initially to FIG. 1, shown in one embodiment of the invented "strike indicator and hook setter" or "fishing line accessory" or "fishing apparatus" 10. This strike indicator 10 has a body 20 having a first end 22 extending to a second end 24. In the preferred embodiment of the present invention as shown in FIGS. 1–4, this first end 22 comprises an apex, while the second end 24 comprises a rim of a generally cup-shaped portion. This cup-shaped portion defining a deflector or water-deflecting portion 30 for facing the lure and for deflecting water. As illustrated in FIG. 1, the rim (second end 24) is the outer extremity of the disc and surrounds and defines an opening 31 into the interior space 33 of the strike indicator 10. The preferred embodiment has a convex side 32 and a concave side 34, with a generally hemispherical shaped body 20 having an orifice 40 extending through its radial axis. This body providing for reinforcement, alignment, and attachment of the strike indicator. Other shapes and orientation of the present invention are also envisioned.

Preferably extending through the body is a center line orifice 40 defined therein. This orifice, or other line connector, is utilized to connect the present invention to the fishing line. In the embodiment shown, this orifice 40 is configured to receive there through the fishing line 80 that the present invention is utilized on. The present invention fixedly connects to the fishing line thereby eliminating any movement along the fishing line. To provide for the setting of the hook, the present invention must be rigidly attached to the line. The term "fixedly" relating to movement, and not to the fact that the present invention can be removed from a fishing line upon which it was previously installed. There are many ways to attach the strike indicator to the leader of a fly line and/or a fishing line in general. The attachment must, however, keep the strike indicator generally perpendicular to the fly and leader when the strike occurs.

While the preferred embodiment of the present invention utilizes a generally cup-shaped deflector, other shapes, sizes, and orientations of deflectores are also envisioned, including, but not limited to, any shape that can deflect water, moving spreading arms, an umbrella-like action, a non-rigid expanding parachute-type deflector, etc.

Referring now to FIG. 2, a first end view of the preferred embodiment of the present invention is shown. This end as viewed from the fishing lure end 84 of the fishing line 80, as shown in FIGS. 3–4. This embodiment particularly shows the attachment slot 42 that has been formed within the water deflecting portion or deflector 30. This attachment slot 42 cooperating with the orifice 40 to provide for connection of the present invention 10 to the fishing line 80 in the preferred embodiment of the present invention.

In the preferred embodiment, the fishing line 80 is folded in half and inserted through the center line orifice 40 through the first end 22, and out the opposite end through the center line orifice 40 adjacent the second end 24. The fishing lure end 84 of the line 80 is then looped through the attachment slot 42; through the loop 50 formed with the fishing line 80, and is (if it isn't already) configured for attachment to the fishing lure 2. The opposite fishing pole end 82 of the fishing line is configured to extend onwards to an attached fishing pole. The fishing line adjacent the first end and/or the second end can be pulled taught thereby affixing strike indicator 10 in a fixed orientation upon the fishing line 80. FIG. 4 shows the fishing line just before it is pulled taught.

Other manners of attaching the apparatus to the fishing line are also envisioned. It is preferred, and necessary in application to fly fishing, for the strike indicator to be spaced a distance, for instance two to six feet, from the lure/fly.

As for the method of construction of the preferred embodiment of the present invention, the present invention must be buoyant, near-buoyant or able to float on or near the water's surface. This can be through solely utilizing buoyant portions, or partially buoyant portions. It is preferred that the present invention floats so that approximately two-thirds of the present invention is submersed and one-third is floating. The term "buoyant" is intended to include floating on the surface of the water and/or floating under water (maintaining a depth and/or slowly sinking). Because the preferred embodiment of the present invention is a strike indicator, the ability of the fisherman to see the present invention is important. Thus, even if the "buoyant" strike indicator actually slowly sinks through the water, the intended benefits of the present invention may still be attained.

Articles of manufacture include any suitable material, including but not limited to: plastic, wood, fibers, cork, glass, ceramic, composite, and foam. This material may or may not also be laminated or coated with a coating, such as a fluorescent coloring allowing the user to more easily see the present invention. The preferred embodiment has a diameter of one inch or less, but larger diameters are also possible.

While there is shown and described the present preferred embodiment of the invention, it is to be distinctly understood that this invention is not limited thereto but may be variously embodied to practice within the scope of the following claims. From the foregoing description, it will be apparent that various changes may be made without departing from the spirit and scope of the invention as defined by the following claims.

I claim:

1. An apparatus for use in fly fishing, the apparatus comprising:
   a fly-fishing leader having a longitudinal axis and a distal end;
   a fly attached to the distal end and having a hook;

a hook-setting strike indicator fixed to the leader a distance from the fly in the range of 2–6 feet, the strike indicator consisting essentially of:

a generally cup-shaped disc having;
- a first, concave side facing the fly;
- a second, convex side away from the fly;
- an outer rim which is the outer extremity of the disc and which has a diameter, the outer rim surrounding and defining an opening into an interior space of the generally cup-shaped disc, the opening extending substantially across the entire diameter;
- a central portion having a orifice through which the leader extends, wherein the central portion is fixed to the leader so that the disc is generally perpendicular to the longitudinal axis of the leader and so that the disc does not move along the leader;

so that said first, concave side of the disc offers resistance in the water to set the hook in a fish's mouth upon a strike by the fish;

wherein the generally cup-shaped disc has a slot and wherein the central portion is fixed to the leader by means of the leader extending through the orifice and being looped through the slot.

* * * * *